United States Patent
Ma et al.

(10) Patent No.: US 8,134,895 B2
(45) Date of Patent: Mar. 13, 2012

(54) CIRCUIT FOR GENERATING TRACKING ERROR SIGNAL

(75) Inventors: Ching-Wen Ma, Nan Tou (TW);
Yung-Chi Yang, Chu Pei (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 812 days.

(21) Appl. No.: 12/138,948

(22) Filed: Jun. 13, 2008

(65) Prior Publication Data

US 2008/0310273 A1 Dec. 18, 2008

(30) Foreign Application Priority Data

Jun. 14, 2007 (TW) .............................. 96121455 A

(51) Int. Cl.
*G11B 7/00* (2006.01)
(52) U.S. Cl. .................................................. 369/44.25
(58) Field of Classification Search .................... None
See application file for complete search history.

(56) References Cited

U.S. PATENT DOCUMENTS 5,258,968 A 11/1993 Matsuda et al.
6,137,755 A 10/2000 Bakx et al.

*Primary Examiner* — Wayne Young
*Assistant Examiner* — Brian Butcher
(74) *Attorney, Agent, or Firm* — Muncy, Geissler, Olds & Lowe, PLLC

(57) ABSTRACT

A circuit for generating a tracking error signal is provided. The circuit includes a digitized circuit, a short signal removing circuit and phase comparator. The digitized circuit receives first and second pick-up signals outputted from a pick-up head, and respectively compares the first and the second pick-up signals with a reference signal to obtain a first digital signal and a second digital signal. The short signal removing circuit is used for removing pulses in the first and the second digital signals, wherein the pulse width of the removed pulses are shorter than a preset time, and the first and second digital without the removed pulses are respectively served as a first determining signal and a second determining signal. The phase comparator receives the first determining signal and the second determining signal for outputting the tracking error signal according to a phase difference between the first and the second determining signals.

9 Claims, 7 Drawing Sheets

CIRCUIT FOR GENERATING TRACKING ERROR SIGNAL

This application claims the benefit of the filing date of Taiwan Application Ser. No. "096121455", filed on "Jun. 14, 2007", the content of which is incorporated herein by reference.

BACKGROUND OF THE INVENTION

1. Field of the invention

The present invention relates to a technology for positioning a disk type storage media, and more particularly, to a circuit for generating a tracking error signal.

2. Description of the Related Art

Due to the prompt development the optical technology, the storage capacity of the optical storage media is becoming larger and larger. Relatively, the track number of optical storage media is becoming more and more. Therefore, to develop the technique for positioning the track is becoming more and more important.

FIG. 1 is a diagram of a conventional method for tracking. Referring to FIG. 1, the label 11 is represented to a position of a pick-up head of an optical disk drive. The pick-up head 11 can be divided into four areas, i.e. A, B, C and D, on the irradiation area of the optical disk. The tracks of the optical storage media include the land tracks and groove tracks. The tracking error signal in prior art can be calculated by the following equation:

$$TE = \phi(I_A + I_C) - \phi(I_B + I_D)$$

The $I_A$, $I_B$, $I_C$ and $I_D$ are pick-up signals and respectively represent intensities detected by light detecting elements A, B, C and D.

FIG. 2 illustrates a block diagram of circuit for generating a tracking error signal published by European Computer Manufactures Association (EMCA). Referring to FIG. 2, the circuit includes a pick-up head 201 with 4 light detecting element, two adding amplifiers 202 and 203, two equalizers 204 and 205, two comparators 206 and 207, a phase comparator 208, two low-pass filters 209 and 210 and a differential amplifier 211. The adding amplifier 202 will add the pick-up signals $I_A$ and $I_C$ to obtain a $(I_A+I_C)$ signal, and the adding amplifier 203 will add the pick-up signals $I_B$ and $I_D$ to obtain a $(I_B+I_D)$ signal. Because the high frequency component of $(I_A+I_C)$ and $(I_B+I_D)$ signals are weak, the equalizers 204 and 205 will respectively amplify the high frequency component of the $(I_A+I_C)$ and $(I_B+I_D)$ signals. The tracking error signal is generated by the process of the comparators 206 and 207, the phase comparator 208, the low-pass filters 209 and 210 and the differential amplifier 211.

There are some improvements for improving the above-mentioned standard circuit of EMCA, such as U.S. Pat. Nos. 5,258,968, 6,137,755, 7,345,963 and 7,345,964. However, those patents submitted by the above do not disclose how to improve or simplify the equalizer. Since the equalizer and the pre-stage analog circuit thereof occupy a lot of layout area in the integrated circuit (IC), so that the layout area of the IC will be increased a lot, furthermore the cost of product with such IC will be increased and the competitiveness thereof will also be decreased.

SUMMARY OF THE INVENTION

In view of the above-mentioned problems, the present invention is directed to a circuit for generating a tracking error signal, wherein the circuit has not any equalizers therein, but the circuit is implemented by the digital circuit to generate the tracking error signal which is accurate as the tracking error signal generated by using the equalizers, so that the circuit submitted by the present invention can be accurately positioned for the pick-up head.

In addition, the present invention is directed to a circuit for generating a tracking error signal to reduce the cost of the product.

To achieve the above-mentioned object, a circuit for generating a tracking error signal is provided in the present invention. The circuit outputs the tracking error signal according to a first pick-up signal and a second pick-up signal outputted from a pick-up head, wherein the first pick-up signal and the second pick-up signal respectively represent reflected intensities of a main beam measured by the first light detecting element and the second light detecting element of the pick-up head. The circuit includes a digitizing circuit, a short signal removing circuit and a phase comparator. The digitizing circuit is coupled to the pick-up head for receiving the first pick-up signal and the second pick-up signal and respectively comparing the first pick-up signal and the second pick-up signal with a reference voltage, so as to obtain a first digital signal and a second digital signal. The short signal removing circuit removes pulses in the first digital signal and the second digital signal, wherein the pulse width of the removed pulses are shorter than a preset time, and the first and the second digital signals without the removed pulses are respectively served as a first determining signal and a second determining signal. The phase comparator receives the first determining signal and the second determining signal for outputting the tracking error signal according to a phase difference between the first determining signal and the second determining signal.

According to an embodiment of the present invention, the digitizing circuit includes a first comparator and a second comparator. A first terminal of the first comparator receives the first pick-up signal; a second terminal thereof receives the reference voltage; an output terminal thereof outputs the first digital signal. The first comparator sets the first digital signal to a first logic state when the first pick-up signal is larger than the reference voltage. whereas the first comparator sets the first digital signal to a second logic state. A first terminal of the second comparator receives the second pick-up signal; a second terminal thereof receives the reference voltage; an output terminal thereof outputs the second digital signal. The second comparator sets the second digital signal to the first logic state when the second pick-up signal is larger than the reference voltage. Otherwise, the second comparator sets the second digital signal to the second logic state.

According to an embodiment of the present invention, the short signal removing circuit includes a first short pulse removing circuit and a second short pulse removing circuit. The first short pulse removing circuit receives the first digital signal for removing pulses in the first digital signal, wherein the pulse width of the removed pulses are shorter than a preset time, and the first digital signal without the removed pulses is served as the first determining signal. The second short pulse removing circuit receives the second digital signal for removing pulses in the second digital signal, wherein the pulse width of the removed pulses are shorter than the preset time, and the second digital signal without the removed pulses is served as the second determining signal.

A circuit for generating a tracking error signal is provided in the present invention, the circuit outputs the tracking error signal according to a first through a fourth pick-up signals which are outputted from a pick-up head, wherein the first through the fourth pick-up signals respectively represent reflected intensities of a main beam respectively measured by a first through a fourth light detecting elements of the pick-up head. The circuit includes a first adding circuit, a second adding circuit, a digitizing circuit, a short signal removing circuit and a phase comparator. The first adding circuit receives and adds the first pick-up signal and the second pick-up signal, so as to obtain the first adding signal. The second adding circuit receives and adds the third pick-up signal and the fourth pick-up signal, so as to obtain the second adding signal. The digitizing circuit receives the first adding signal and the second adding signal, and respectively compares the first adding signal and the second adding signal with a reference voltage to obtain a first digital signal and a second digital signal. The short signal removing circuit is used for removing pulses in the first and second signals, wherein the pulse width of the removed pulses are shorter than a preset time, and the first and the second digital signals without the removed pulses are respectively served as a first determining signal and a second determining signal. The phase comparator receives the first determining signal and the second determining signal, and outputs the tracking error signal according to the first determining signal and the second determining signal according to a phase difference between the first determining signal and the second determining signal.

According to an embodiment of the present invention, the digitizing circuit includes a first comparator and a second comparator. A first terminal of the first comparator receives the first pick-up signal; a second terminal thereof receives the reference voltage; an output terminal thereof outputs a first digital signal. The first comparator sets the first digital signal to a first logic state when the first pick-up signal is larger than the reference voltage, whereas the first comparator sets the first digital signal to a second logic state. A first terminal of the second comparator receives the second pick-up signal; a second terminal thereof receives the reference voltage; an output terminal thereof outputs the second digital signal. The second comparator sets the second digital signal to the first logic state when the second pick-up signal is larger than the reference voltage, whereas the second comparator sets the second digital signal to the second logic state.

According to an embodiment of the present invention, the short signal removing circuit includes a first short pulse removing circuit and a second short pulse removing circuit. The first short pulse removing circuit receives the first digital signal for removing pulses in the first digital signal, wherein the pulse width of the removed pulses are shorter than a preset time, and the first digital signal without the removed pulses is to served as the first determining signal. The second short pulse removing circuit receives the second digital signal for removing pulses in the second digital signal, wherein the pulse width of the removed pulses are shorter than the preset time, and the second digital signal without the removed pulses is served as the second determining signal.

A circuit for generating a tracking error signal is provided in the present invention. The circuit outputs the tracking error signal according to a first through a fourth pick-up signals which are outputted from a pick-up head, wherein the first through the fourth pick-up signals respectively represent reflected intensities of a main beam respectively measured by a first through a fourth light detecting elements of the pick-up head. The circuit includes a first digitizing circuit, a second digitizing circuit, a first short signal removing circuit, a second short signal removing circuit, a first phase comparator, a second phase comparator and an adding circuit. The first digitizing circuit receives the first pick-up signal and the second pickup signal, and respectively compares the first pick-up signal and the second pickup signal with a reference voltage to obtain a first digital signal and a second digital signal. The first short signal removing circuit removes pulses in the first digital signal and the second digital signal, wherein the pulse width of the removed pulses are shorter than a preset time, and the first and the second digital signals without the removed pulses are respectively served as a first determining signal and a second determining signal. The first phase comparator receives the first determining signal and the second determining signal, and outputs a first phase comparing signal according to a phase difference between the first determining signal and the second determining signal. The second digitizing circuit receives the third pick-up signal and the fourth pick-up signal, and respectively compares the third pick-up signal and the fourth pick-up signal with the reference voltage to obtain a third digital signal and a fourth digital signal. The second short signal removing circuit removes pulses in the third digital signal and the fourth digital signal, wherein the pulse width of the removed pulses are shorter than the preset time, and the third and the fourth digital signals without the removed pulses are respectively served as a third determining signal and a fourth determining signal. The second phase comparator receives the third determining signal and the fourth determining signal, and outputs a second phase comparing signal according to a phase difference between the third determining signal and the fourth determining signal. The adding circuit receives and adds the first phase comparing signal and the second phase comparing signal for outputting the tracking error signal.

A digitizing circuit, a short signal removing circuit and a phase comparator are adopted in the design of the circuit provided by the present invention for generating a tracking error signal. In the prior art, the equalizer is only for amplifying the short signal in the pick-up signal. The equalizer is unused when the tracking error signal is generated without using the short signal. Therefore, the circuit of the present invention can be entirely used digitizing manner for accurately generating the tracking error signal. Besides, since the integrated circuit uses the circuit of the present invention therein, so that the layout area and costs of the integrated circuit can be reduced.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

EMBODIMENT OF THE INVENTION

Figure 3:
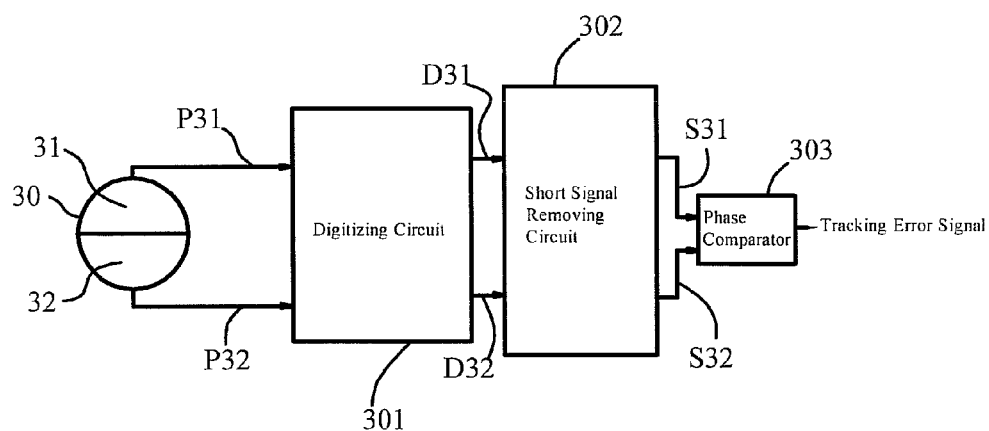
FIG. 3 is a circuit diagram depicting a circuit for generating tracking error signal according to an embodiment of the present invention.

FIG. 3 is a circuit diagram depicting a circuit for generating tracking error signal according to an embodiment of the present invention. Referring to FIG. 3, the circuit includes a digitizing circuit 301, a short signal removing circuit 302 and a phase comparator 303. The optical pick-up head 30 includes a first light detecting element 31 and a second light detecting element 32. The first light detecting element 31 is used for outputting a first pick-up signal P31. The second light detecting element 32 is used for outputting a second pick-up signal P32. Amplitudes of the first pick-up signal P31 and the second pick-up signal P32 respectively represent intensities measured by the first light detecting element 31 and the second light detecting element 32.

The digitizing circuit 301 is used for comparing the first pick-up signal P31 and the second pick-up signal P32 with a reference voltage to obtain a first digital signal D31 and a second digital signal D32. Since the first pick-up signal P31 and the second pick-up signal P32 respectively have weaker high frequency signal components therein, such as the short signals which are shorter than 3T in CD or DVD, where T is a period of bit symbol. In DVD system, a logic state of a signal is asserted by the period of the signal have to longer than at least 3T, thus, the 3T is given an example herein. When the first pick-up signal P31 and the second pick-up signal P32 are respectively comparing with the reference voltage, the first digital signal D31 and the second digital signal D32 may consequently have high frequency glitch, and on a short signal of 3T does not amplify by any equalizers, so that the tracking error signal cannot be generated correctly. Thus, the short signal removing circuit 302 must be used for removing pulses in the first digital signal D31 and the second digital signal D32, wherein the pulse width of the removed pulses are shorter than a preset time, i.e. 3T, in order to output a first determining signal S31 and a second determining signal S32.

Finally, the phase comparator 303 receives the first determining signal S31 and the second determining signal S32 for determining the amplitude of the tracking error signal and then outputting the determined tracking error signal according to a phase difference between the first determining signal S31 and the second determining signal S32. General speak, the first determining signal S31 and the second determining signal S32 can be processed to obtain the tracking error signal through the conventional phase comparator 303.

It should be noted that although in the aforementioned embodiment has described a possible form of the circuit for generating the tracking error signal of the embodiment of the present invention, it is known to those skilled in the art that various manufacturers have different designs of the pick-up head 30 and the short signal removing circuit 302, thus the application of the present invention should not be limited to this possible form. In other words, as long as the pick-up signals outputted from the pick-up head converts to the digital signals through a digitizing circuit, and the short signal removing circuit 302 removes the glitch in the digital signals, afterward the tracking error signal is outputted and then the amplitude of the outputted tracking error signal is determined by the phase comparator 303, it falls in the spirit of the present invention.

Figure 4:
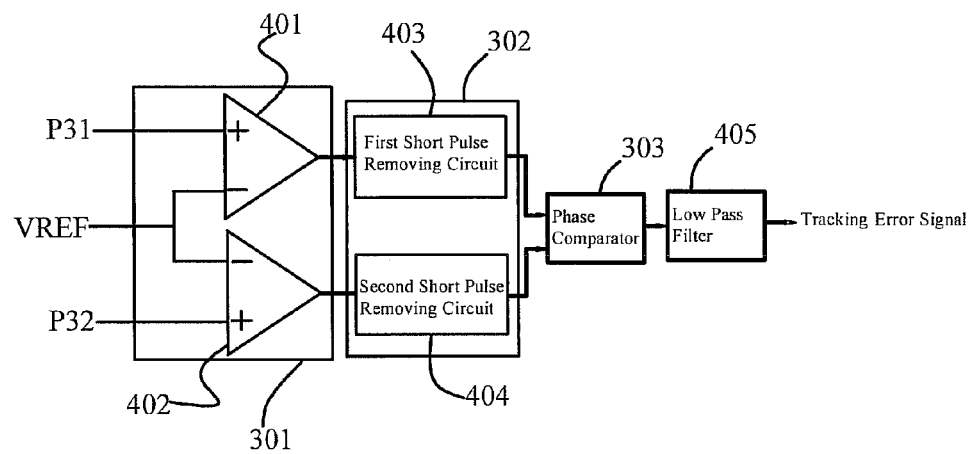
FIG. 4 is a circuit diagram depicting the circuit for generating tracking error signal according to the embodiment of FIG. 3.

FIG. 4 is a circuit diagram depicting the circuit for generating the tracking error signal according to the embodiment of FIG. 3 of the present invention. In FIG. 4, the digitizing circuit 301 is implemented by a first comparator 401 and a second comparator 402; the short signal removing circuit 302 is implemented by a first short pulse removing circuit 403 and a second short pulse removing circuit 404. In addition, there is a low-pass filter 405 within this embodiment.

The comparators 401 and 402 respectively receive the first pick-up signal P31, the second pick-up signal P32 and the reference voltage VREF. When the first pick-up signal P31 is larger than the reference voltage VREF, the first digital signal D31 outputted from the first comparator 401 is in a positive saturation voltage or in a logically high voltage. When the first pick-up signal P31 is smaller than the reference voltage VREF, the first digital signal D31 outputted from the first comparator 401 is in a negative saturation voltage or in a logically low voltage. Similarly, when the second pick-up signal P32 is larger than the reference voltage VREF, the second digital signal D32 outputted from the second comparator 402 is in the logically high voltage; when the second pick-up signal P32 is smaller than the reference voltage VREF, the second digital signal D32 outputted from the second comparator 402 is in the logically low voltage.

The first short pulse removing circuit 403 is used for removing pulses in the first digital signal D31 to generate the first determining signal S31 when the pulse width of the removed pulses are shorter than the preset time. The second short pulse removing circuit 404 is used for removing pulses in the second digital signal D32 to generate the second determining signal S32 when the removed pulses are shorter than the preset time (such as 3T). Finally, the first determining signal S31 and the second determining signal is processed through the phase comparator 303 and then a signal outputted from the phase comparator 303 is filtered by the low-pass filter 405, the tracking error signal is obtained.

According to the above-mentioned embodiment, the equalizer in the prior art circuit is unnecessary in the embodiment of the present invention because the digital logic circuit used in the embodiment of the present invention can achieve to generate the tracking error signal. Therefore, the embodiment of the present invention can be used to reduce the layout area of the integrated circuit (IC) and then decrease the costs of IC. In addition, the above-mentioned logically high voltage or logically low voltage will be changed as different design of circuit, such as the different connection relationship in the positive terminal and the negative terminal of the comparators.

Figure 1:
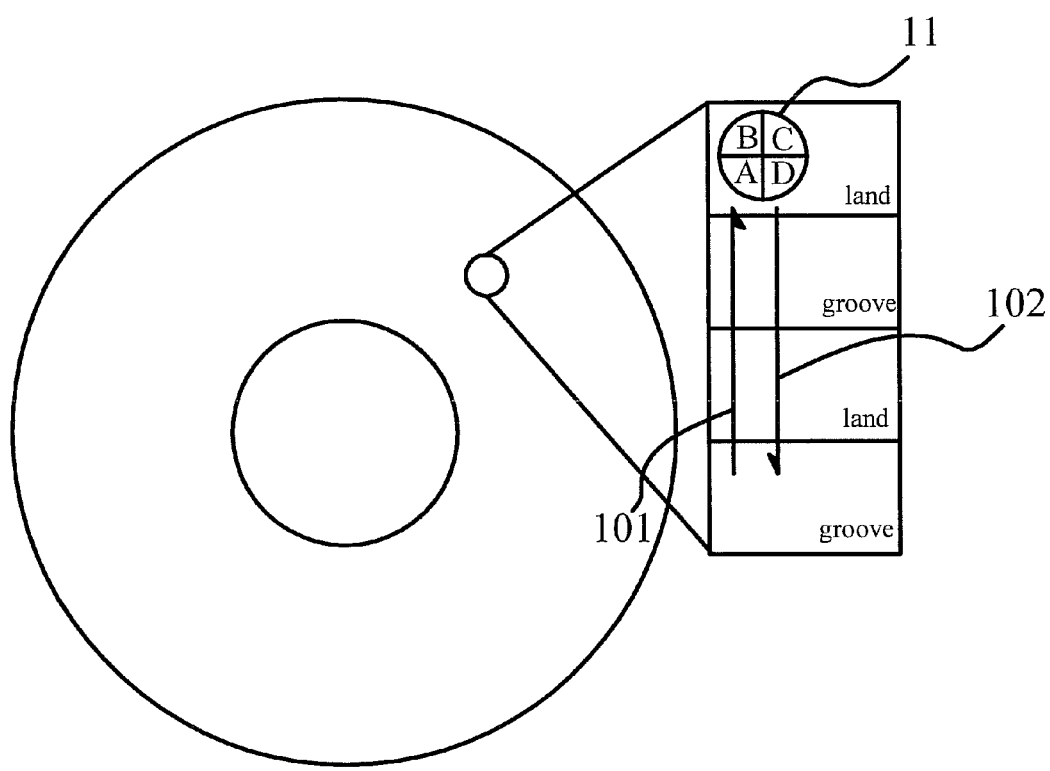
FIG. 1 is a tracking method in the prior art.
Figure 2:
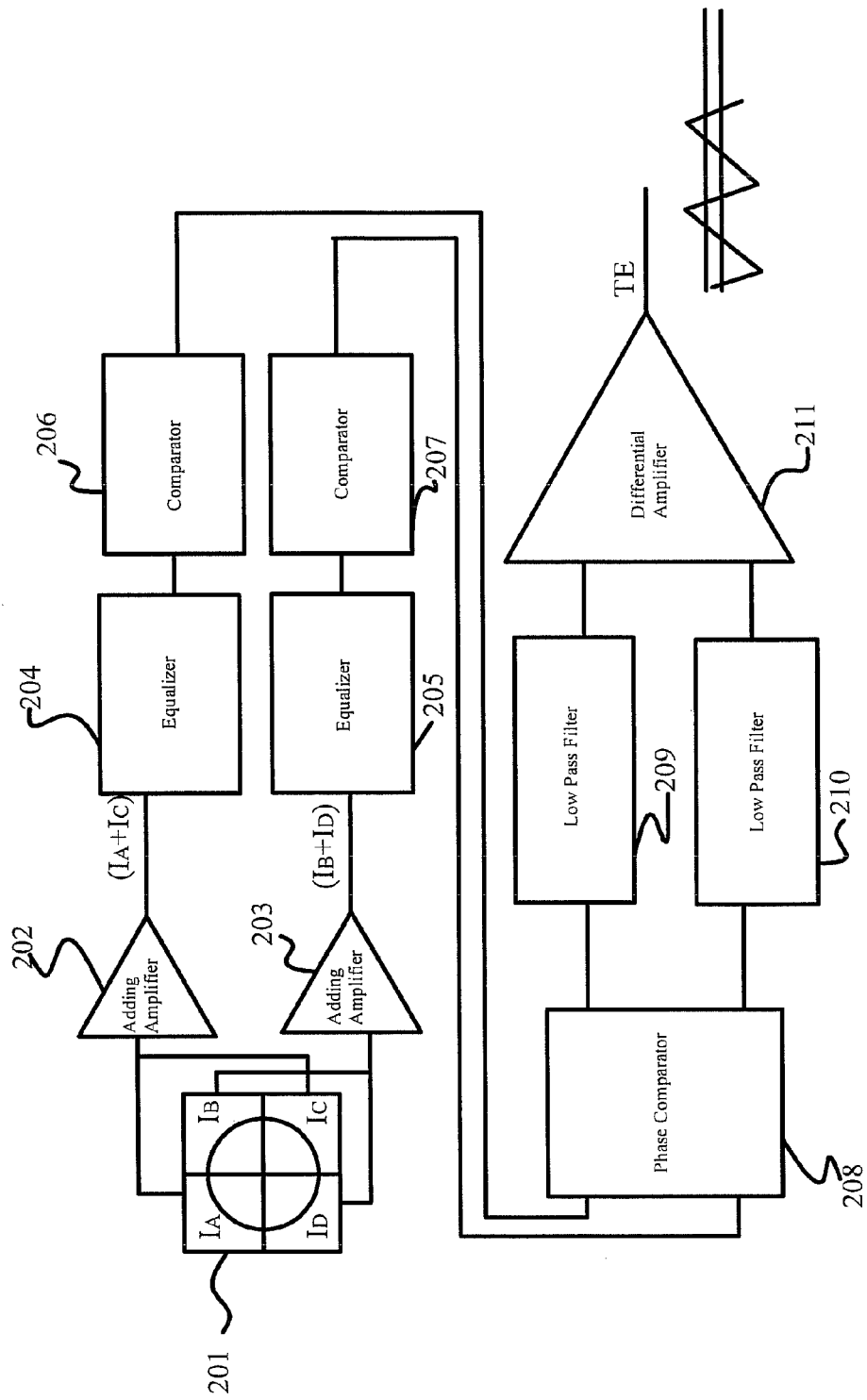
FIG. 2 illustrates a block diagram of a circuit for generating a tracking error signal published by European Computer Manufactures Association (EMCA) standard.
Figure 5:
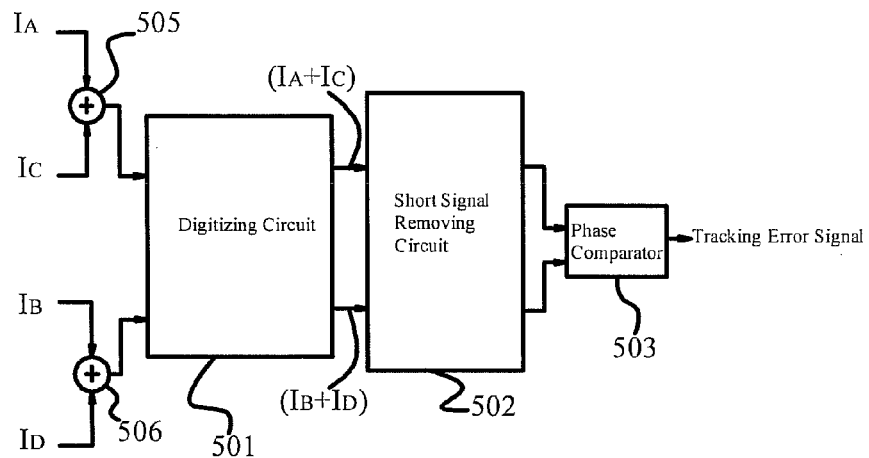
FIG. 5 is a circuit diagram depicting a circuit for generating tracking error signal according to the embodiment of the present invention.

FIG. 5 is a circuit diagram depicting a circuit for generating the tracking error signal according to the embodiment of the present invention. Referring to FIG. 5, the difference between this embodiment and the abovementioned embodiment in FIG. 3 is that the circuit in FIG. 5 further includes a first adding circuit 505 and a second adding circuit 506. The circuit in FIG. 5 is adapted for the pick-up head disclosed in FIG. 2. The first adding circuit 505 adds the pick-up signals IA and IC to obtain a first adding signal (IA+IC). The second adding circuit 506 adds the pick-up signals IB and ID to obtain a second adding signal (IB+ID). In the circuit, the operations of the digitizing circuit 501, the short signal removing circuit 502, the phase comparator 503 is the same as the circuit in the FIG. 3. Thus, the detail description is omitted.

Figure 6:
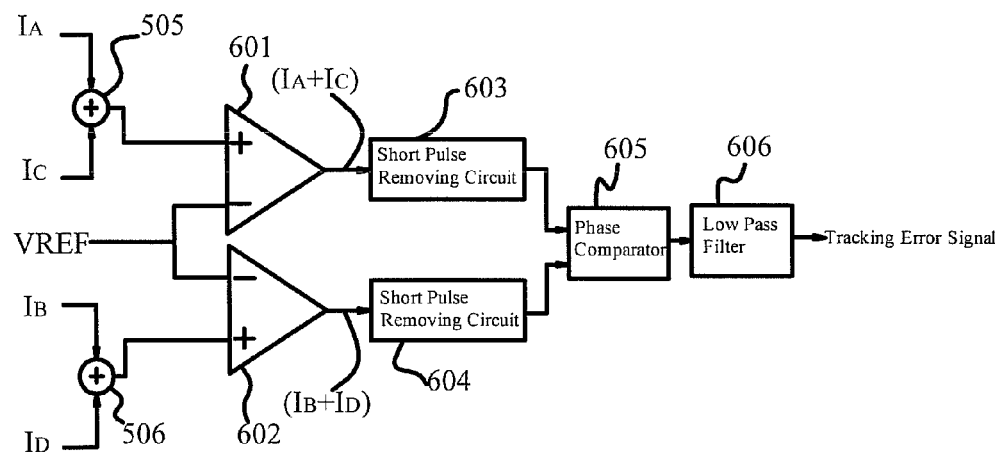
FIG. 6 is a circuit diagram depicting the circuit for generating tracking error signal according to the embodiment of FIG. 5.

FIG. 6 is a circuit diagram depicting the circuit for generating the tracking error signal according to the embodiment of the FIG. 5 of the present invention. In the FIG. 6, the digitizing circuit 501 is implemented by a first comparator 601 and a second comparator 602; the short signal removing circuit 502 is implemented by a first short pulse removing circuit 603 and a second short pulse removing circuit 604. In addition, there is a low-pass filter 606 within this embodiment. An operation thereof is similar to the operation of the circuit in FIG. 4, thus, the description is omitted.

Figure 7:
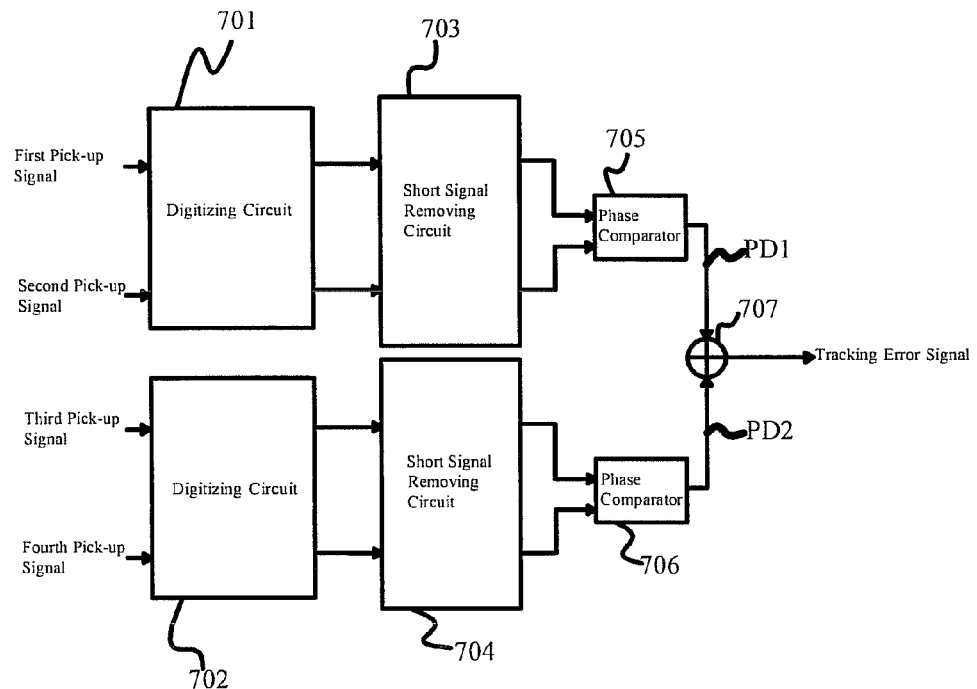
FIG. 7 is a circuit diagram depicting a circuit for generating tracking error signal according to the embodiment of the present invention.

FIG. 7 is a circuit diagram depicting a circuit for generating the tracking error signal according to the embodiment of the present invention. Referring to FIG. 7, the difference between this embodiment and the abovementioned embodiment in the FIG. 3 is that the embodiment in the FIG. 3 only has one set of a digitizing circuit 301, a short signal removing circuit 302 and a phase comparator 303, but the embodiment in the FIG. 7 has two sets of digitizing circuits 701 and 702, short signal removing circuits 703 and 704, phase comparators 705 and 706 and a adding circuit 707. A first phase comparing signal PD1 is obtained through the processes of the digitizing circuit 701, the short signal removing circuit 703 and the phase comparator 705 according to the first pick-up signal and the second pick-up signal. A second phase comparing signal PD2 is obtained through the processes of the digitizing circuit 702, the short signal removing circuit 704 and the phase comparator 706 according to the third pick-up signal and the fourth pick-up signal. The adding circuit 707 adds the first phase comparing signal PD1 and the second phase comparing signal PD2 to obtain the tracking error signal.

Figure 8:
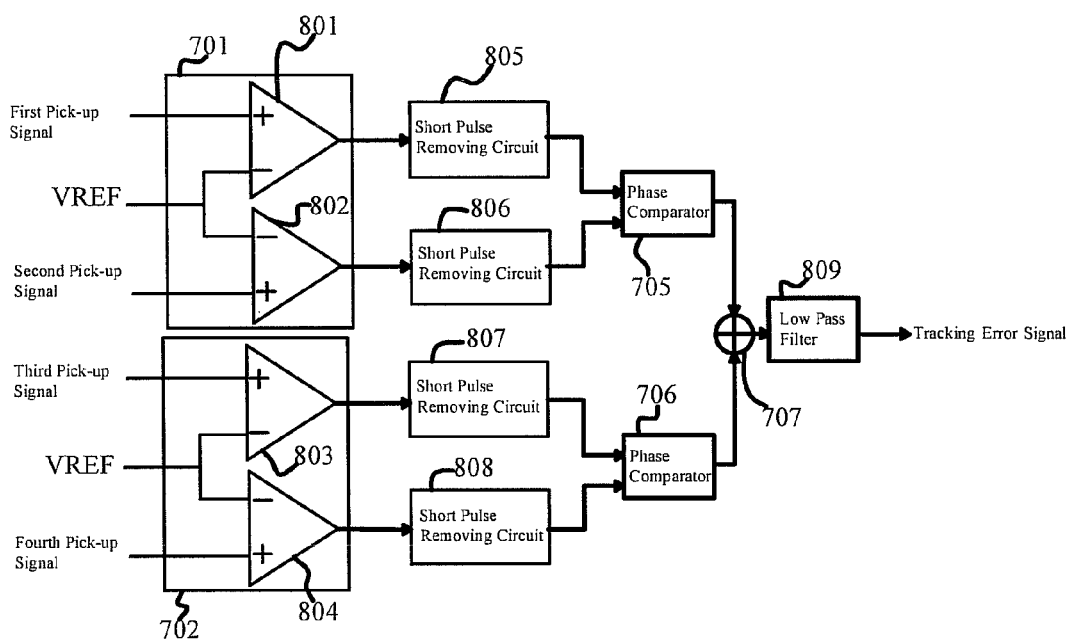
FIG. 8 is a circuit diagram depicting the circuit for generating tracking error signal according to the embodiment of FIG. 7.

FIG. 8 is a circuit diagram depicting the circuit for generating the tracking error signal according the embodiment in FIG. 7 of the present invention. Referring to FIG. 8, similarly, the digitizing circuits 701 and 702 are respectively implemented by comparators 801, 802, 803 and 804; the short signal removing circuits 703 and 704 are respectively implemented by short pulse removing circuits 805, 806, 807 and 808; in addition, there is a low-pass filter 809 coupled to the adding circuit 707, wherein the low-pass filter 809 is used for removing the high frequency components in the tracking error signal. The circuit operation is similar to the abovementioned circuits in FIG. 4 and FIG. 5, thus, the detail description is omitted. In the same way, although the circuit in the FIG. 8 is the preferred embodiment of the circuit in FIG. 7, but person of ordinary skill in the art should know that low-pass filter can be set between the phase comparator 705 and the adding circuit 707 and/or between the phase comparator 706 and the adding circuit 707. In addition, the adding circuit 707 can be implemented by a differential amplifier. The detail description is omitted.

Figure 9A:
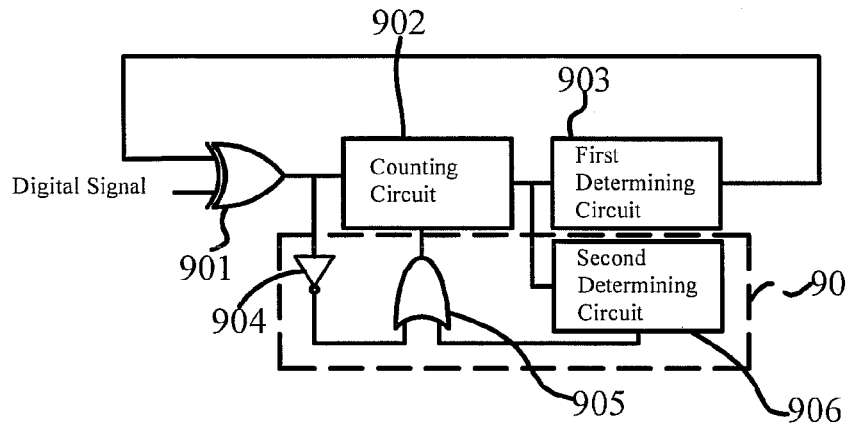
FIG. 9A is a detailed circuit diagram depicting the short pulse removing circuit 403, 404, 603, 604, 805, 806, 807, 808 according to the embodiment of the present invention.
Figure 9B:
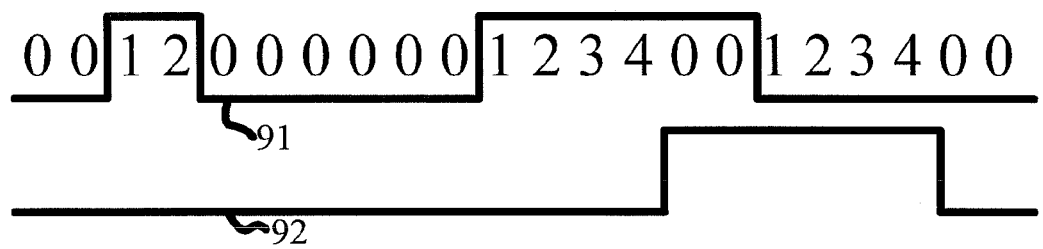
FIG. 9B illustrates a timing chart according to the embodiment of FIG. 9A.
Figure 9B:
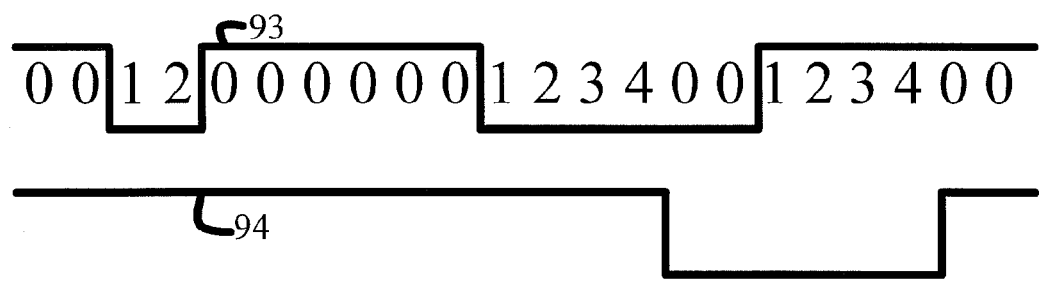

FIG. 9A is a detail circuit diagram depicting the short pulse removing circuits 403, 404, 603, 604, 805, 806, 807 and 809 in according to the above mentioned embodiment of the present invention. FIG. 9B illustrates a timing chart according to the short pulse removing circuit in FIG. 9A. Referring to FIG. 9A and FIG. 9B, the short pulse removing circuit includes an XOR gate 901, a counting circuit 902, a first determining circuit 903, a reset circuit 90, wherein the reset circuit 90 includes an inverter 904, an OR gate 905 and a second determining circuit 906. An input terminal of the XOR gate 901 receives a digital signal outputted from digitizing signal of the abovementioned embodiment. Another input terminal of the XOR gate is coupled to an output terminal of the determining circuit 903. An input terminal of the counting circuit 902 is coupled to an output terminal of the XOR gate 901 for counting an enabled time of a signal outputted from the XOR gate 901. The first determining circuit 903 and the second determining circuit 906 correspondingly have a preset value, wherein the preset value relates to the pulse width of a pulse to be removed. The preset value is 3 in the embodiment.

Assume that the inputted digital signal is as the waveform 91 in the FIG. 9B. The output signal of the first determining circuit 903 is as waveform 92, and a counting value outputted from the counting circuit 902 will begin to count from 0 when the digital signal is in the logic 1 state. When the counting value counted by the counting circuit 902 is counted to 2 then the digital signal 92 becomes to logic 0 state, which means the enable time of the digital signal 92 is too short, the reset circuit 90 resets the counting circuit 902 through the inverter 904 and the OR gate 905 and the signal 92 outputted from the first determining signal 903 doesn't change its logic state. When the counting value is counted to exceed 3 by the counting circuit 902, the first determining circuit 903 changes the logic level of the determining signal outputted from the first determining circuit 903, and the second determining circuit 906 outputs the logic I voltage to reset the counting circuit 902 through the OR gate 905 to make the counting value become a initial value, such as 0. Similarly, when an inputted digital signal is as waveform 93 in FIG. 9B, thus an output signal of the determining circuit is as waveform 94. The operation of the abovementioned circuit is similar to above, thus, the unnecessary detail description is omitted.

Although the preset value in the embodiment is 3, but person having ordinary skill in the art should know that the preset value have to be determined according to the operational frequency of the circuit in FIG. 9A.

Figure 10:
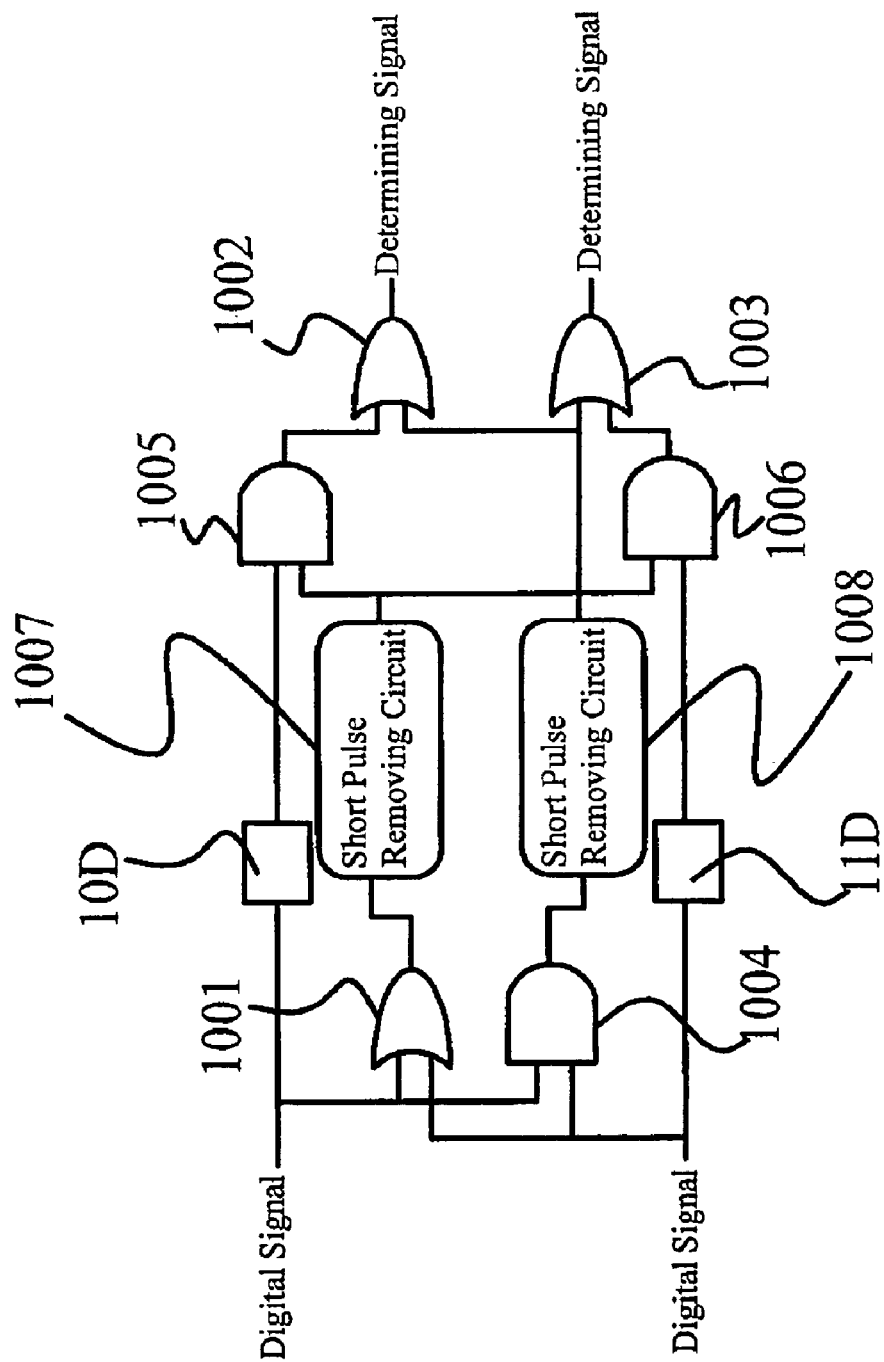
FIG. 10 is a detailed circuit diagram depicting the short signal removing circuit according to the embodiment of the present invention.

FIG. 10 is a detail circuit diagram depicting the short signal removing circuit according to the embodiment of the present invention. Referring to FIG. 10, the circuit includes a first OR gate 1001, a second OR gate 1002, a third OR gate 1003, a first AND gate 1004, a second AND gate 1005, a third AND gate 1006, a first short pulse removing circuit 1007, a second short pulse removing circuit 1008 and a delay circuits 10D and 11D. The coupling relationship is shown as FIG. 10. The abovementioned first short pulse removing circuit 1007 and second short pulse removing circuit 1008 can be implemented by the circuit in FIG. 9A. When this compositive type of the short signal removing circuit is used in place of 302 in FIG. 3, the short signals of 3T in the first pick-up signal P31 and the second pick-up signal P32 being removed at same point can be ensured. Similarly, the circuit can be applied in the short signal removing circuit 502 in the FIG. 5, 703 and 704 in the FIG. 7. The detail description is omitted.

In summary, a digitizing circuit, a short signal removing circuit and a phase comparator are adopted in the design of the circuit for generating a tracking error signal to achieve using the digital circuit for generating the tracking error signal. Thus, the present invention at least includes the following advantages of:

1. The analog equalizer for amplifying the high frequency component of pick up signals is unnecessary.

2. The layout area of the IC and cost thereof can be reduced when the digital design in the embodiment of the present invention is implemented in the IC.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A circuit for generating a tracking error signal, the circuit outputs the tracking error signal according to a first pick-up signal and a second pick-up signal outputted from a pick-up head, wherein the first pick-up signal and the second pick-up signal respectively represent reflected intensities of a main beam measured by a first light detecting element and a second light detecting element of the pick-up head, the circuit comprising:
    a digitizing circuit, coupled to the pick-up head, for comparing the first pick-up signal and the second pick-up signal, so as to obtain a first digital signal and a second digital signal;
    a short signal removing circuit, for removing pulses in the first digital signal and the second digital signal to generate a first determining signal and a second determining signal respectively when the pulse width of pulses are shorter than a preset time, wherein the short signal removing circuit is implemented using a pure digital logic circuit; and
    a phase comparator, for receiving the first determining signal and the second determining signal, and outputting the tracking error signal according to a phase difference between the first determining signal and the second determining signal.

2. The circuit for generating the tracking error signal according to claim 1, wherein the digitizing circuit comprises:
    a first comparator, including a first terminal of the first comparator for receiving the first pick-up signal, a second terminal thereof for receiving a reference voltage, an output terminal thereof for outputting the first digital signal, wherein the first digital signal is set to be a first logic state when the first pick-up signal is larger than the reference voltage, otherwise the first digital signal is set to be a second logic state; and
    a second comparator, including a first terminal of the second comparator for receiving the second pick-up signal, a second terminal thereof for receiving the reference voltage, an output terminal thereof for outputting the second digital signal, wherein the second digital signal is set to be the first logic state when the second pick-up signal is larger than the reference voltage, otherwise the second digital signal is set to be the second logic state.

3. The circuit for generating the tracking error signal according to claim 1, wherein the short signal removing circuit comprises:
    a first short pulse removing circuit, for removing the pulses in the first digital signal to generate the first determining signal when the pulse width of the removed pulses in the first digital signal are shorter than the preset time; and
    a second short pulse removing circuit, for removing the pulses in the second digital signal to generate the second determining signal when the pulse width of the removed pulses are shorter than the preset time.

4. The circuit for generating the tracking error signal according to claim 3, wherein the first short pulse removing circuit comprises:
    an XOR gate, including a first input terminal of the XOR gate used for receiving the first digital signal;
    an inverter, wherein an input terminal of the inverter is coupled to an output terminal of the XOR gate;
    an OR gate, including a first input terminal of the OR gate coupled to an output terminal of the inverter;
    a counting circuit, including a reset terminal of the counting circuit coupled to an output terminal of the OR gate, an input terminal thereof is coupled to the output terminal of the XOR gate, wherein when a signal outputted from the output terminal of the XOR gate is enabled, a counting value is accumulated according to a specific preset time, and when a signal inputted to the reset terminal of the counting circuit is enabled, the counting value is reset;
    a first determining circuit, including an input terminal of the first determining circuit coupled to an output terminal of the counting circuit for receiving the counting value, an output terminal thereof is coupled to a second input terminal of the XOR gate for outputting the first determining signal, wherein a logic state of the first determining signal is changed when the counting value is larger than a preset value, and
    a second determining circuit, including an input terminal of the second determining circuit coupled to the output terminal of the counting circuit for receiving the counting value, and an output terminal thereof coupled to a second input terminal of the OR gate, wherein the output terminal of the second determining circuit is enabled to reset the counting circuit when the counting value is larger than the preset value.

5. The circuit for generating the tracking error signal according to claim 3, wherein the second short pulse removing circuit comprises:
    an XOR gate, including a first input terminal of the XOR gate for receiving the second digital signal;
    an inverter, including an input terminal of the inverter coupled to an output terminal of the XOR gate;
    an OR gate, including a first input terminal of the OR gate coupled to an output terminal of the inverter;
    a counting circuit, including a reset terminal of the counting circuit coupled to an output terminal of the OR gate, an input terminal thereof coupled to the output terminal of the XOR gate, wherein when a signal outputted from the output terminal of the XOR gate is enabled, a counting value is accumulated according to a specific preset time, and when a signal inputted to the reset terminal of the counting circuit is enabled, the counting value is reset;
    a first determining circuit, including an input terminal of the first determining circuit coupled to an output terminal of the counting circuit for receiving the counting value, and an output terminal thereof coupled to a second input terminal of the XOR gate for outputting the second determining signal, wherein a logic state of the second determining signal is changed when the counting value is larger than a preset value; and
    a second determining circuit, including an input terminal of the second determining circuit coupled to the output terminal of the counting circuit for receiving the counting value, and an output terminal thereof coupled to a second input terminal of the OR gate, wherein the output terminal of the second determining circuit is enabled to reset the counting circuit when the counting value is larger than the preset value.

6. The circuit for generating the tracking error signal according to claim 1, wherein the short signal removing circuit comprises:
   a first OR gate, including a first input terminal of the first OR gate for receiving the first digital signal, and a second input terminal thereof for receiving the second digital signal;
   a first AND gate, including a first input terminal of the first AND gate for receiving the first digital signal, and a second input terminal thereof for receiving the second digital signal;
   a first short pulse removing circuit, including an input terminal of the first short pulse removing circuit coupled to an output terminal of the first OR gate, for removing the pulses within a signal outputted from the output terminal of the first OR gate, when the pulse width of the removed pulses in the signal are shorter than the preset time;
   a second short pulse removing circuit, including an input terminal of the second short pulse removing circuit coupled to an output terminal of the first AND gate, for removing the pulses within a signal outputted from the output terminal of the first AND gate, when the pulse width of the removed pulses are shorter than the preset time;
   a first delay circuit, including an input terminal of the first delay circuit for delaying the first digital signal during a predetermining time and then outputting the delayed first digital signal;
   a second delay circuit, including an input terminal of the second delay circuit for delaying the second digital signal during the predetermining time and then outputting the delayed second digital signal;
   a second AND gate, including a first input terminal of the second AND gate coupled to an output terminal of the first delay circuit, a second input terminal thereof coupled to an output terminal of the first short pulse removing circuit;
   a third AND gate, including a first input terminal of the third AND gate coupled to an output terminal of the second delay circuit, and a second input terminal thereof coupled to the output terminal of the first short pulse removing circuit;
   a second OR gate, including a first terminal of the second OR gate coupled to an output terminal of the second AND gate, and a second input terminal thereof coupled to an output terminal of the second short pulse removing circuit, for outputting the first determining signal; and
   a third OR gate, including a first input terminal of the third OR gate coupled to an output terminal of the third AND gate, a second input terminal thereof coupled to the output terminal of the second short pulse removing circuit, for outputting the second determining signal.

7. The circuit for generating the tracking error signal according to claim 6, wherein the first short pulse removing circuit comprises:
   an XOR gate, including a first input terminal of the XOR gate coupled to the output terminal of the first OR gate;
   an inverter, including an input terminal of the inverter coupled to an output terminal of the XOR gate;
   an OR gate, including a first input terminal of the OR gate coupled to an output terminal of the inverter;
   a counting circuit, including a reset terminal of the counting circuit coupled to an output terminal of the OR gate, and an input terminal thereof coupled to the output terminal of the XOR gate, wherein when a signal outputted from the output terminal of the XOR gate is enabled, a counting value is accumulated according to a specific preset time, and when a signal inputted to the reset terminal of the counting circuit is enabled, the counting value is reset;
   a first determining circuit, including an input terminal of the first determining circuit coupled to an output terminal of the counting circuit for receiving the counting value, and an output terminal thereof coupled to a second input terminal of the XOR gate, a second input terminal of the second AND gate and a second input terminal of the third AND gate, wherein a logic state of a signal outputted from the output terminal of the first determining circuit is changed when the counting value is larger than a preset value; and
   a second determining circuit, including an input terminal of the second determining circuit coupled to the output terminal of the counting circuit for receiving the counting value, and an output terminal thereof coupled to the second input terminal of the OR gate, wherein the output terminal of the second determining circuit is enabled to reset the counting circuit when the counting value is larger than the preset value.

8. The circuit for generating the tracking error signal according to claim 6, wherein the second short pulse removing circuit comprises:
   an XOR gate, including a first input terminal of the XOR gate coupled to the output terminal of the first AND gate;
   an inverter, including an input terminal of the inverter coupled to an output terminal of the XOR gate;
   an OR gate, including a first input terminal of the OR gate coupled to an output terminal of the inverter;
   a counting circuit, including a reset terminal of the counting circuit coupled to an output terminal of the OR gate, and an input terminal thereof coupled to the output terminal of the XOR gate, wherein when a signal outputted from the output terminal of the XOR gate is enabled, a counting value is accumulated according to a specific preset time, and when a signal inputted to the reset terminal of the counting circuit is enabled, the counting value is reset;
   a first determining circuit, including an input terminal of the first determining circuit coupled to an output terminal of the counting circuit for receiving the counting value, and an output terminal thereof coupled to a second input terminal of the XOR gate, the second input terminal of the second OR gate and the second input terminal of the third OR gate, wherein a logic state of a signal outputted from the output terminal of the first determining circuit is changed when the counting value is larger than a preset value; and
   a second determining circuit, including an input terminal of the second determining circuit coupled to the output terminal of the counting circuit for receiving the counting value, and an output terminal thereof coupled to a second input terminal of the OR gate, wherein a signal outputted from the output terminal of the second determining circuit is enabled thereby resetting the counting circuit when the counting, value is larger than the preset value.

9. The circuit for generating the tracking error signal according to claim 1, further comprising:
   a low pass filter, coupled to the phase comparator, for filtering high frequency component within the tracking error signal.

* * * * *